United States Patent
Myono

(10) Patent No.: US 6,535,052 B2
(45) Date of Patent: Mar. 18, 2003

(54) HIGH EFFICIENCY CHARGE PUMP CIRCUIT

(75) Inventor: Takao Myono, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/948,484

(22) Filed: Sep. 7, 2001

(65) Prior Publication Data

US 2002/0030534 A1 Mar. 14, 2002

(30) Foreign Application Priority Data

Sep. 8, 2000 (JP) .................................... 2000-272850

(51) Int. Cl.[7] ................................................ G05F 1/10
(52) U.S. Cl. ...................................... 327/536; 327/537
(58) Field of Search ............................... 327/536, 537, 327/589

(56) References Cited

U.S. PATENT DOCUMENTS 6,184,741 B1 * 2/2001 Ghilardelli et al. ......... 327/536
6,292,048 B1 * 9/2001 Li ............................... 327/536
6,359,798 B1 * 3/2002 Han et al. .................... 327/536
6,373,324 B2 * 4/2002 Li et al. ...................... 327/536

OTHER PUBLICATIONS

Dickson, John F., "On-Chip High-Voltage Generation in MNOS Integrated Circuits Using an Improved Voltage Multiplier Technique", IEEE Journal of Solid-State Circuits, vol. SC-11, No. 3, pp. 374-378, Jun. 1976.

* cited by examiner

Primary Examiner—Timothy P. Callahan
Assistant Examiner—Linh Nguyen
(74) Attorney, Agent, or Firm—Fish & Richardson PC

(57) ABSTRACT

A charge pump circuit of the Dickson type is provided, which circuit is characterized by clock drivers CD1 and CD2 for supplying clock pulses to coupling capacitors C1–C3. In other words, it is arranged in such a manner that the rising time and falling time of the clock pulses CLK and CLKB are extended to the extent that the outputs from the clock drivers CD1 and CD2 will not cause resonance.

8 Claims, 9 Drawing Sheets

HIGH EFFICIENCY CHARGE PUMP CIRCUIT

BACKGROUND OF THE INVENTION

The present invention relates to a charge pump circuit used in a power circuit and the like, and more particularly to a charge pump circuit capable of preventing a parasitic bipolar action and thereby achieving high efficiency and a large current output.

Recently, attention has been given to a step-up power circuit using a charge pump circuit of the Dickson type as a power circuit for mobile equipment, such as a cellular phone. The charge pump circuit of the Dickson type is discussed in detail in, for example, John F. Dickson, "On-chip High-Voltage Generation in MNOS Integrated Circuits Using an Improved Voltage Multiplier Technique", *IEEE JOURNAL OF SOLID-STATE CIRCUITS*, VOL. SC-11, NO. 3, pp. 374–378, JUNE, 1976. The step-up charge pump circuit of this type can operate at high frequencies, which makes it possible to reduce the size of an exterior capacitor attached to the outside of the LSI. Hence, it is best applied in downsizing the mobile equipment.

The charge pump circuit, in principle, comprises charge transfer elements in more than one stage connected to a voltage source (Vdd), and each connection node (pumping node) is connected to one end of a corresponding coupling capacitor while a complementary clock is supplied to the other end of each coupling capacitor, so that charge is transferred to the latter stages in succession, thereby ideally obtaining a step-up voltage expressed as: $(n+1) \times Vdd$, where n represents the number of stages in the charge pump circuit.

Various improvements to the conventional charge pump circuit of the Dickson type has already proposed to provide a charge pump circuit capable of achieving a large output current (several to a dozen mA) and high efficiency in U.S. patent application Ser. No. 09/769,034 filed on Jan. 25, 2001. An example arrangement of this charge pump circuit is depicted in FIGS. 4 through 7. Although the arrangement and operation of this circuit will be described in detail below, the characteristics thereof are as follows.

(1) It is arranged such that when charge transfer MOS transistors (M1, M2, M3, and M4) are ON, a gate-source voltage Vgs in each is twice the power voltage. Hence, not only can the ON resistance of the charge transfer MOS transistors be reduced, but also it is sufficient to design a gate oxide film thick enough to withstand 2 Vdd for all the transistors. Consequently, the ON resistance can be designed lower than in a case where a source-drain voltage Vgs in each charge transfer MOS transistor is unequal.

(2) It is arranged such that a relation, expressed as: a gate-body voltage Vgb=a gate-drain voltage Vgd, is established by short-circuiting the drain and the body. The purpose of this arrangement is to make the gate oxide film thinner by reducing a body bias voltage, and further, to eliminate a rise in the threshold voltage caused by the back gate bias effect.

However, the above-described charge pump circuit has a problem that a bipolar action readily occurs. When a bipolar action does not occur, the circuit efficiency η is 95%, but once a bipolar action occurs, the circuit efficiency η drops to as low as 50%. Generally, the circuit efficiency η is defined as:

η=(output power/input power)×100.

SUMMARY OF THE INVENTION

The present invention was devised to solve the conventional problems as discussed above, and has an object to provide a charge pump circuit which prevents a bipolar action by eliminating influences from the parasitic inductance.

A charge pump circuit of the present invention is furnished with: a plurality of charge transfer MOS transistors connected in series; coupling capacitors having their one ends respectively connected to connection points of the charge transfer MOS transistors; and clock drivers for alternately supplying clock pulses in anti-phase to the other ends of the coupling capacitors, a predetermined voltage being applied to the charge transfer MOS transistor in a first stage so that a step-up voltage is outputted from the charge transfer MOS transistor in a latter stage, and the charge pump circuit is characterized in that a rising time and a falling time of the clock pulses outputted from the clock drivers are set longer than a time necessary for resonance of outputs from the clock drivers to occur.

The present invention is based on the discovery made first by the inventor of the present invention that one of the factors inducing a bipolar action occurring in a charge pump circuit is a resonance phenomenon of the outputs from the clock drivers. Conventional clock drivers have been chiefly aiming at achieving a large current output, and for this reason, quite a short time is set to the rising time and falling time. Thus, the presence of parasitic inductances and parasitic capacitances causes a bipolar action.

According to the present invention, however, the rising time and falling time of the clock pulses outputted from the clock drivers are set to a larger value than a value at or below which the resonance of the outputs from the clock drivers occurs. Thus, because it is arranged that no resonance phenomenon occurs, a bipolar action induced by the resonance phenomenon can be prevented in a reliable manner, thereby making it possible to prevent deterioration of the circuit efficiency η.

DETAILE DESCRIPTION OF THE PREFERRED EMBODIMENTS

The following description will describe the mechanism of a bipolar action studied by the inventor of the present invention.

Figure 4:
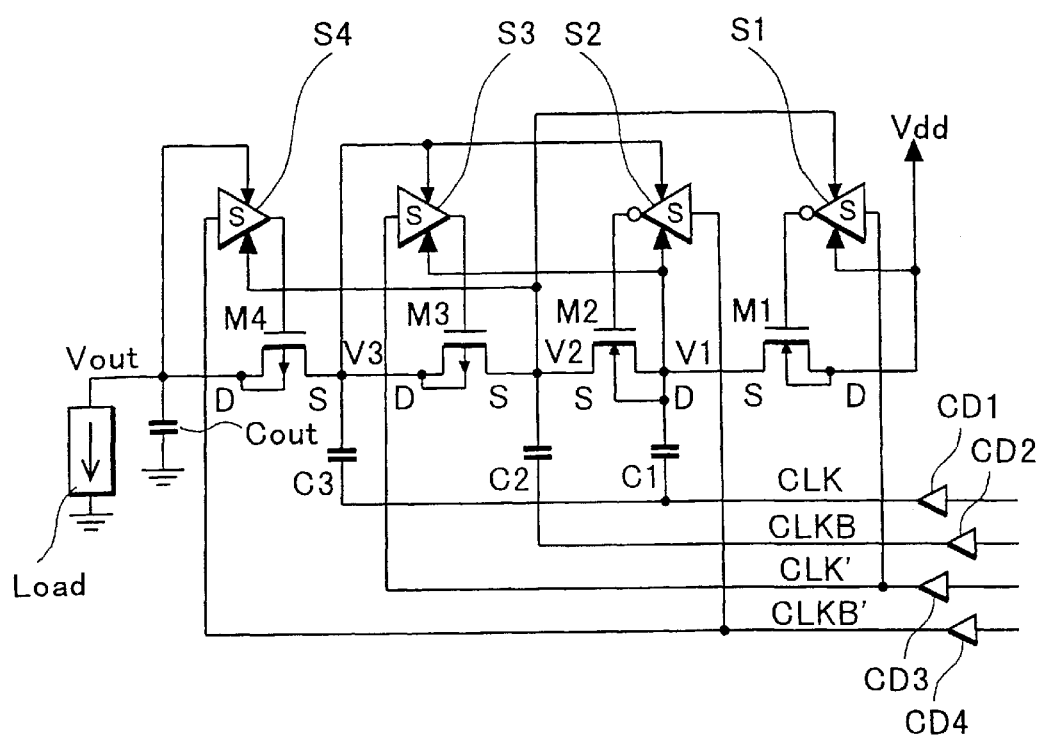
FIG. 4 is a view showing the charge pump circuit in accordance with an embodiment of the present invention.
Figure 8A:
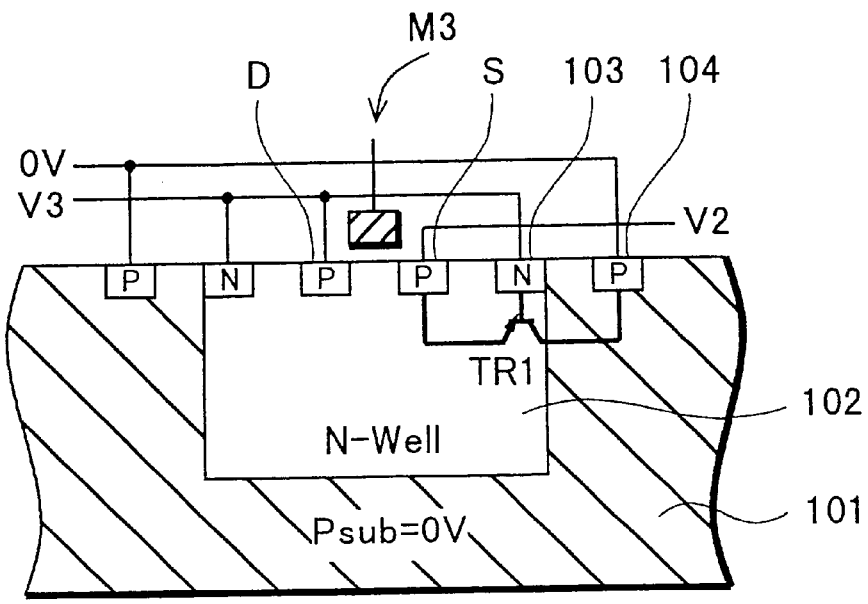
FIGS. 8A and 8B are views showing a cross sectional arrangement of a charge transfer MOS transistor shown in FIG. 4.
Figure 8B:
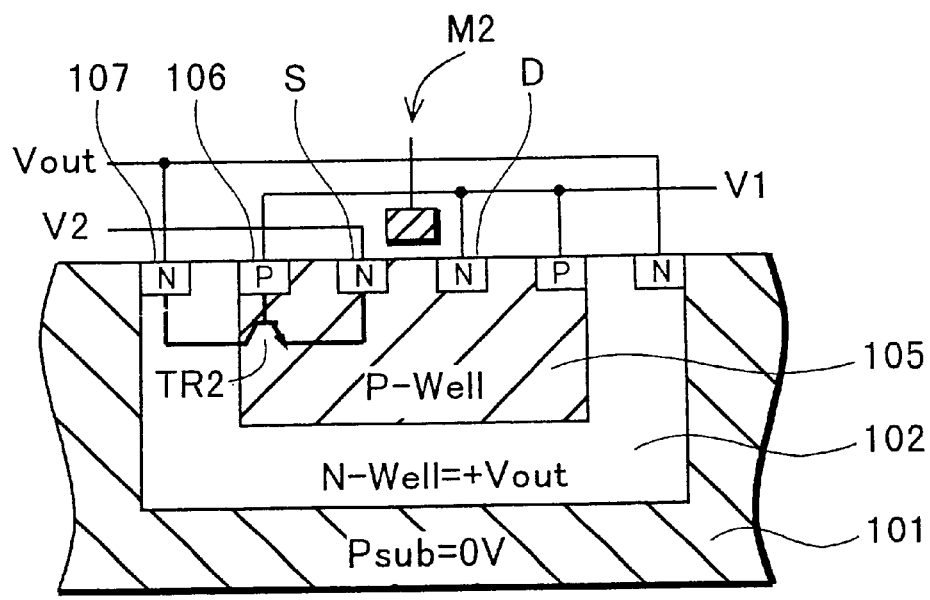

FIGS. 8A and 8B are views showing a cross sectional arrangement of the charge transfer MOS transistor shown in FIG. 4. As shown in FIG. 8A, the charge transfer MOS transistor M3 (P-channel type)is formed on the surface of an N-well 102 provided on a P-type semiconductor body 101. A drain D is connected to an N-type layer 103 provided within the N-well 102 through a wire, whereby the drain D and the body (herein, the N-well 102) are short-circuited. Consequently, a PNP-type parasitic bipolar transistor TR1 is formed. In other words, a source S corresponds to an emitter, the N-well 102 to a base, and the P-type semiconductor body 101 to a collector.

According to the above arrangement, when the charge transfer MOS transistor M3 is switched ON, a current flows from the source S to the drain D so that the charge is transferred. Here, if a source-drain voltage Vds is larger than a built-in voltage Vbi at a parasitic diode composed of the source S (emitter) and N-well 102 (Vds>Vbi), a forward current flows through the diode, whereupon the parasitic bipolar transistor TR1 is switched ON. Then, a large current starts to flow from a pumping node (voltage node V2) to the semiconductor body 101. This causes a significant loss of the current and the circuit efficiency η is lowered.

Also, as shown in FIG. 8B, the charge transfer MOS transistor M2 (N-channel type) is formed on the surface of a P-well 105. The P-well 105 is provided within the N-well 102 and is electrically isolated from the semiconductor body 101. In addition, an output voltage Vout is applied to the N-well 102.

The drain D is connected to a P-type layer 106 provided within the P-well 105 through an aluminum wire or the like, whereby the drain D and the body (herein, the P-well 105) are short-circuited. Consequently, an NPN-type parasitic bipolar transistor TR2 is formed. In other words, the source S corresponds to the emitter, the P-well 105 to the base, and the N-well 102 to the collector.

According to the above arrangement, when the charge transfer MOS transistor M2 is switched ON, a current flows from the drain D to the source S so that the charge is transferred. Here, if the source-drain voltage Vds is larger than the built-in voltage Vbi at a parasitic diode composed of the source S (emitter) and the P-well 105 (Vds>Vbi), a forward current flows through the diode, whereupon the parasitic bipolar transistor TR2 is switched ON. Then, a large current starts to flow from an output to the pumping node (voltage node V2). This also causes a significant loss of the current and the circuit efficiency η is lowered.

Such being the case, the inventor of the present invention studied these problems assiduously and discovered that the bipolar action as described above is induced by two factors. The first factor is too large impedance of a clock driver that supplies a clock to the charge transfer MOS transistor and the capacitor. The second factor is the influences of parasitic inductance, such as a bonding lead line. When influences are given from the inductance, resonant waveforms are shaped at the voltage nodes V1, V2, V3, and V4 of the charge pump circuit shown in FIG. 4, which triggers overshooting and ringing. As a result, the aforementioned state expressed as Vds>Vbi develops and a bipolar action occurs.

Figure 9:
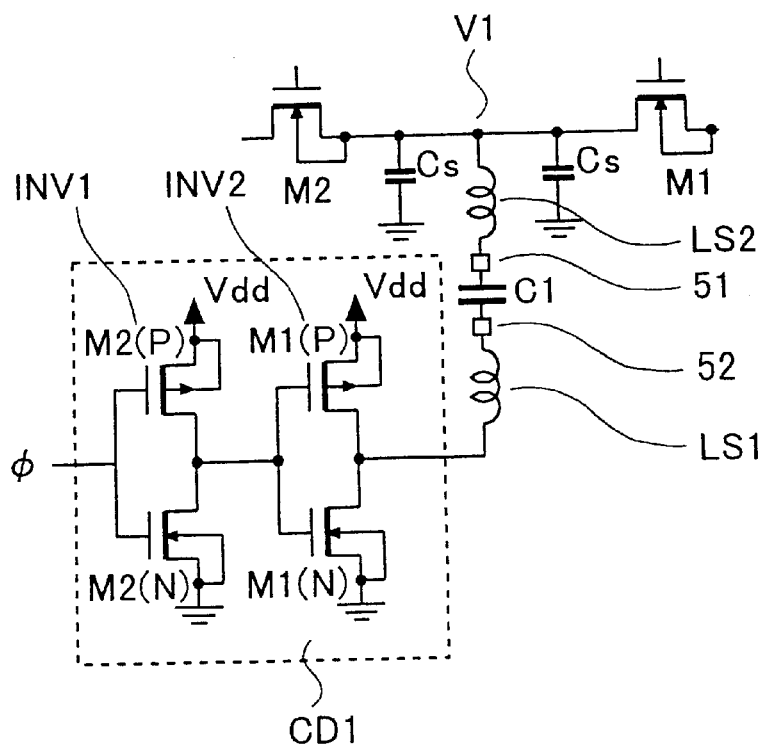
FIG. 9 is a partial circuit diagram showing a first stage of a conventional charge pump circuit.

The following description will describe the influences from the parasitic inductance more in detail with reference to FIGS. 9 through 11B. FIG. 9 is a partial circuit diagram showing a first stage of the charge pump circuit shown in FIG. 4. M1 and M2 represent the charge transfer MOS transistors. CD1 represents a clock driver composed of invertors INV1 and INV2. C1 represents an external capacitor and numerals 51 and 52 represent external lead terminals.

When the charge pump circuit is incorporated into a package, an external connection pad (not shown) is connected to both the external lead terminals 51 and 52 by means of wire bonding. The presence of inductances, approximately 8 nH at the external lead and approximately 2 nH at the bonding wire, has been known. In other words, there is inductance LS1 between the voltage node V1 and the external lead terminal 51, and there is inductance LS2 between the output of the clock driver CD1 and the external lead terminal 52. Also, the external connection pad within the LSI is provided with parasitic capacitances Cs. Thus, resonant waveforms on a frequency determined by these parasitic inductances LS1 and LS2 and the parasitic capacitances Cs are shaped at the voltage node V1.

Figure 10A:
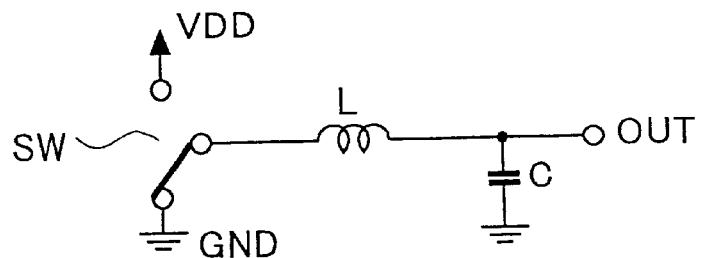
FIGS. 10A and 10B are schematic views explaining a resonance phenomenon.
Figure 10B:
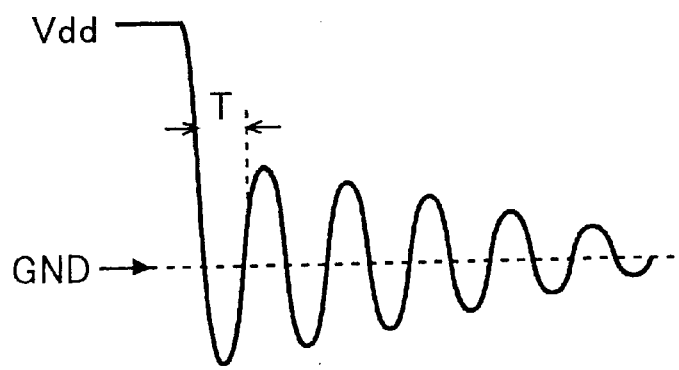
Figure 11A:
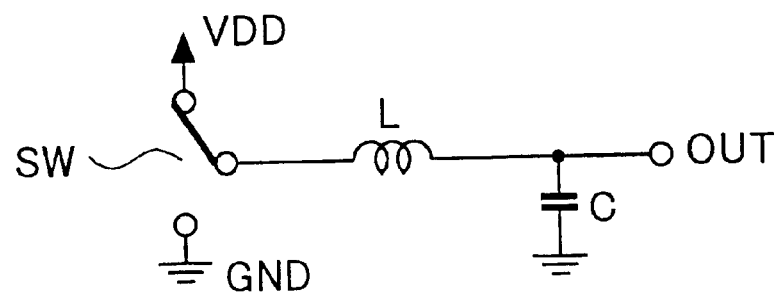
FIGS. 11A and 11B are schematic views explaining the resonance phenomenon.
Figure 11B:
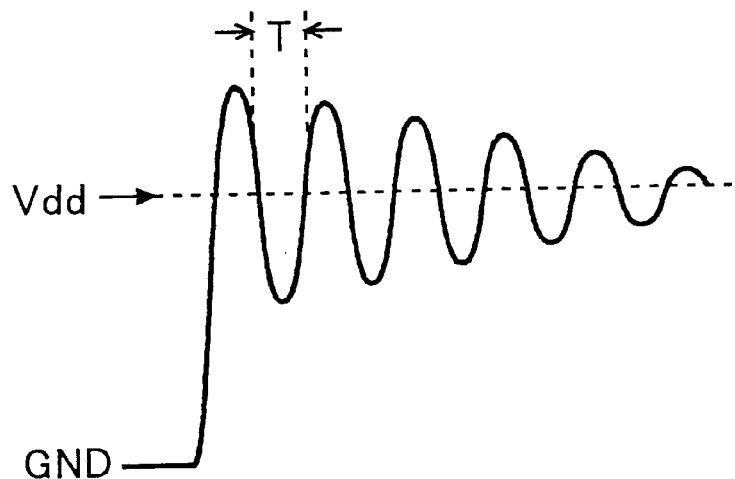

The following description will schematically describe the resonance phenomenon with reference to FIGS. 10A and 10B and FIGS. 11A and 11B. As shown in FIG. 10A, after a capacitor C is charged by switching a switch SW to the power source Vdd side, the switch SW is switched abruptly to the ground side. Then, as shown in FIG. 10B, resonant waveforms, which have a cycle period T determined by inductance L of the coil and the capacitance of the capacitor C, are shaped at the output terminal OUT. Also, as shown in FIG. 11A, after the capacitor C is discharged by switching the switch SW to the ground side, the switch SW is switched abruptly to the power source Vdd side. Then, as shown in FIG. 11B, resonant waveforms, which have a cycle period T determined by L and C, are shaped at the output terminal OUT. The resonant waveforms thus shaped attenuate gradually by the ON resistance of the switch SW, the impedance of the coil, and the dielectric loss of the capacitor. Here, it may be appropriate to assume that the switch SW corresponds to the clock driver of the charge pump circuit.

Figure 1:
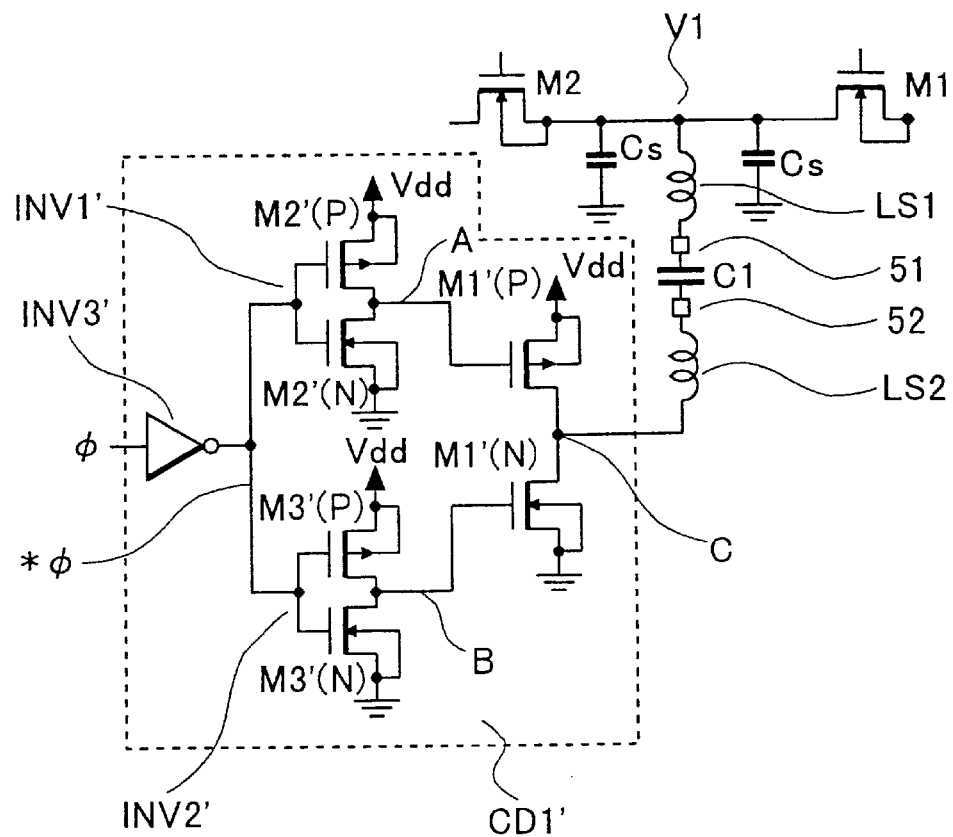
FIG. 1 is a partial circuit diagram of a charge pump circuit in accordance with an embodiment of the present invention.

The following description will describe a charge pump circuit in accordance with one embodiment of the present invention with reference to FIGS. 1 through 7. FIG. 1 is a partial circuit diagram showing a first stage of the charge pump circuit shown in FIG. 4. In the drawing, like components are labeled with like reference numerals with respect to FIG. 9 and the description of these components is not repeated for ease of explanation.

As has been discussed above, when the charge pump circuit is incorporated into a package and a coupling capacitor is provided at the external, parasitic inductances LS1 and LS2 and parasitic capacitances Cs are present. It is revealed that the resonance phenomenon occurs at the output of the clock driver CD1' by the inductance and capacitance components, which in turn induces a bipolar action.

Thus, the present invention provides an improvement that slows down the rising and falling of the clock driver CD1' to prevent the resonance phenomenon. The clock driver CD1' has an arrangement as follows. That is, an identical clock signal φ is inputted to both a first inverter INV1' and a second inverter INV2' through a third inverter INV3'. The third inverter INV3' is a waveform shaping inverter and an inverse output signal *φ therefrom is applied to the inputs of the first inverter INV1' and second inverter INV2'.

Also, an output from the first inverter INV1' is applied to the gate of a first output transistor M1' (P) (P-channel type MOS transistor) for driving the same. On the other hand, an output from the second inverter INV2' is applied to the gate of a second output transistor M1' (N)(N-channel type MOS transistor) for driving the same. The source of the first output transistor M1' (P) is connected to a power voltage Vdd. The source of the second output transistor M1' (N) is grounded. The first output transistor M1' (P) and the second output transistor M1' (N) are connected to each other at their respective drains that together form an output terminal of the clock driver CD1'.

In addition, the first inverter INV1' is composed of a P-channel type MOS transistor M2' (P) and an N-channel type MOS transistor M2' (N), and the second inverter INV2' is composed of a P-channel type MOS transistor M3' (P) and an N-channel type MOS transistor M3' (N).

With the above-described circuit arrangement, an example size W/L for each MOS transistor is as follows. Here, a capital W represents a channel width and a capital L represents a channel length.

Charge transfer MOS transistor M1: 1000 μm/1.8 μm

Charge transfer MOS transistor M2: 1000 μm/1.8 μm

First output transistor M1' (P): 6000 μm/1.8 μm

Second output transistor M1' (N): 2000 μm/1.8 μm

M2' (P): 100 μm/1.8 μm

M2' (N): 10 μm/4 μm

M3' (P): 10 μm/4 μm

M3' (N): 100 μm/1.8 μm

As can be understood from the foregoing, the transistor sizes of the first output transistor M1' (P) and second output transistor M1' (N) are set so that they have low ON resistance. Also, with the first inverter INV1', the transistor sizes of M2' (P) and M2' (N) are set so that they have low ON resistance and high ON resistance, respectively. Conversely, with the second inverter INV2', the transistor sizes of M3' (P) and M3' (N) are set so that they have high ON resistance and low ON resistance, respectively.

For ease of explanation, the above description described the arrangement of only the first stage portion of the charge pump circuit shown in FIG. 4. It should be appreciated, however, that the same description applies to the latter stages as well. More specifically, the clock drivers CD1' and CD2' for supplying clock pulses to the external capacitors C1–C3 are of the identical circuit arrangement except that input clock signals φ therefrom are in anti-phase.

Figure 2:
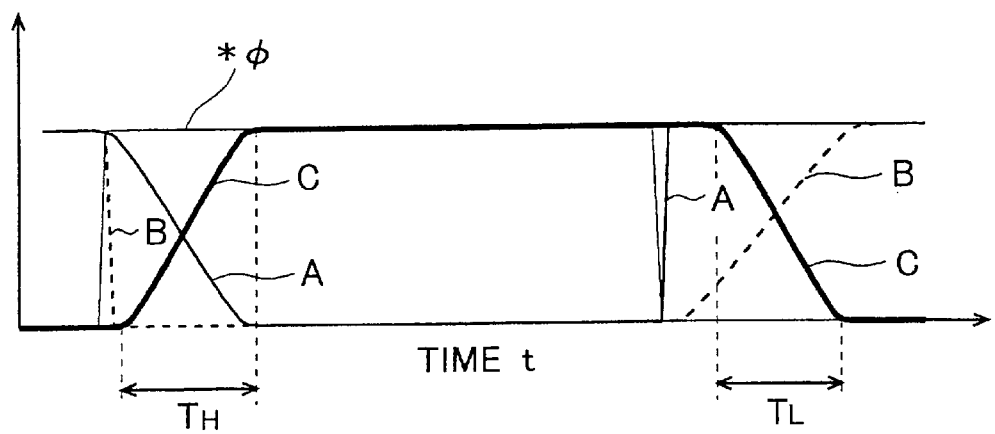
FIG. 2 is a view showing operation waveforms of a clock driver in accordance with an embodiment of the present invention.

Next, with reference to FIG. 2, the following description will describe the operation of the clock driver CD1' of the above-described arrangement. Assume that an inverse output signal *φ from the third inverter IV3' has risen up to the high level from the low level. Then, because the N-channel type MOS transistor M2' (N) of the first inverter INV1' has high ON resistance, an output voltage of the first inverter INV1' (a voltage at a point A shown in FIG. 1) falls gradually. This slows down the rising to the high level of an output voltage of the first output transistor (a voltage at a point C shown in FIG. 1). Consequently, by setting the rising time $T_H$ longer than the cycle period of the resonant waveforms determined by the parasitic inductances LS1 and LS2 and the parasitic capacitances Cs, it is possible to prevent a resonance phenomenon at the rising of an output clock pulse of the clock driver CD1'.

On the other hand, because the N-channel type MOS transistor M3' (N) of the second inverter INV2' has low ON resistance, an output therefrom, that is, a voltage at a point B shown in FIG. 1, falls abruptly. More specifically, in this case, the clock driver CD1' switches OFF the second output transistor M1' (N) first, and thence it switches ON the first output transistor M1' (P). As a result, a lead-through current will flow through neither the first output transistor M1' (P) nor the second output transistor M1' (N).

Meanwhile, the inverse output signal *φ from the third inverter IV3' falls from the high level to the low level. Then, because the P-channel type MOS transistor M3' (P) of the second inverter INV2' has high ON resistance, an output voltage of the second inverter INV2' (a voltage at the point B) rises gradually. This slows down the falling to the low level of an output voltage of the second output transistor (a voltage at the point C). Consequently, by setting the falling time $T_L$ longer than the cycle period of the resonant waveforms determined by the parasitic inductances LS1 and LS2 and the parasitic capacitances Cs, it is possible to prevent a resonance phenomenon at the falling of an output clock pulse of the clock driver CD1'.

On the other hand, because the P-channel type MOS transistor M1' (P) of the first inverter INV1' has low ON resistance, an output therefrom, that is, a voltage at the point A, rises abruptly. More specifically, in this case, the clock driver CD1' switches OFF the first output transistor M1' (P) first, and thence it switches ON the second output transistor M1' (N). As a result, a lead-through current will flow through neither the first output transistor M1' (P) nor the second output transistor M1' (N).

Figure 3A:
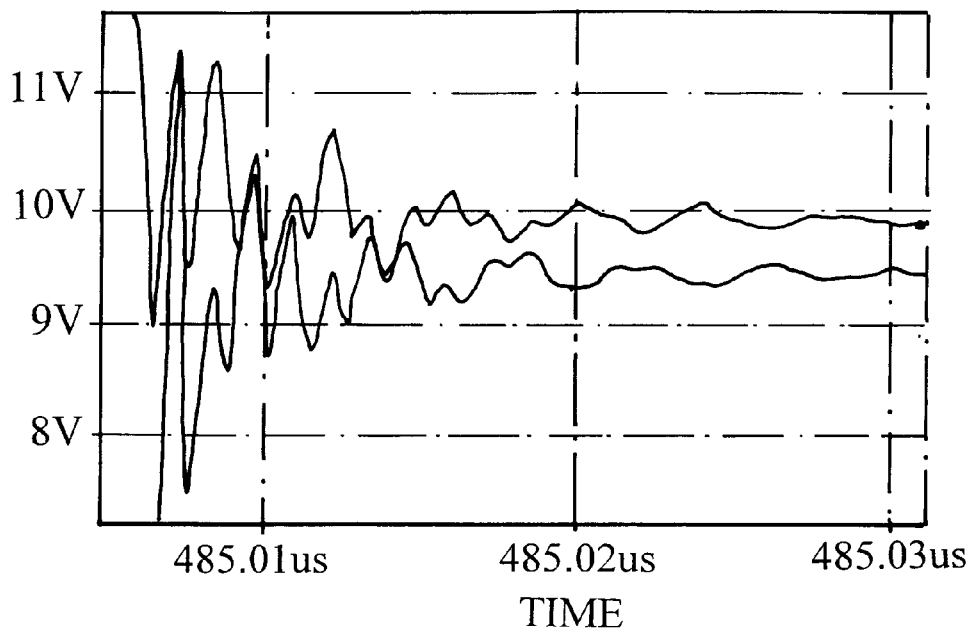
FIGS. 3A and 3B are views showing waveforms indicating simulation results of the charge pump circuits.
Figure 3B:
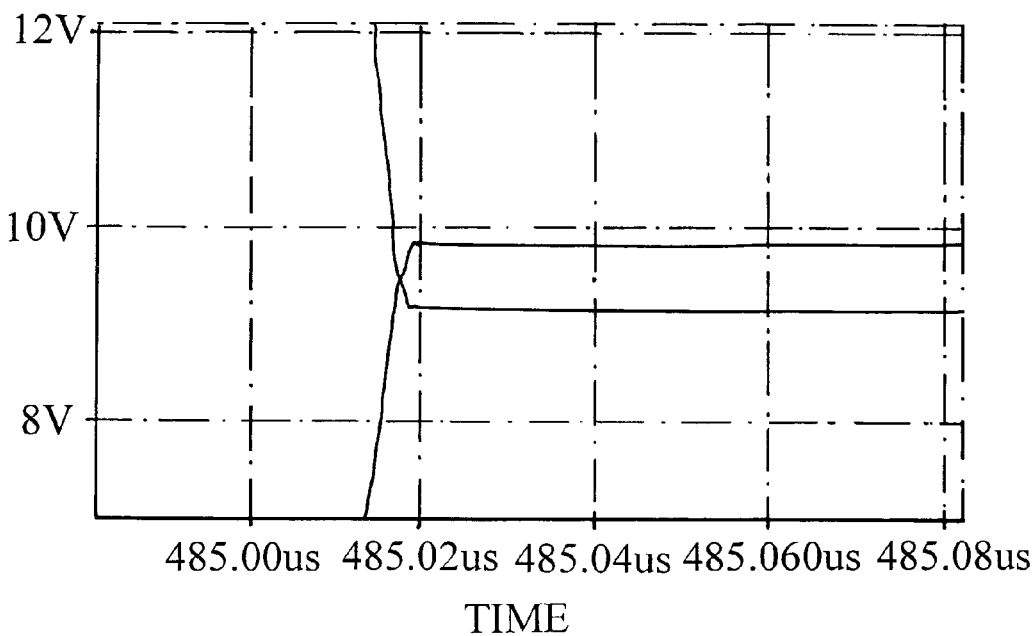

Next, FIGS. 3A and 3B show the simulation results of the pumping nodes V1 and V2 in the charge pump circuit shown in FIG. 4 when 10 nH is given as a sum value of the parasitic inductances (LS1+LS2). Herein, the SPICE model was used as a circuit simulator.

As shown in FIG. 3A, when no measure is taken against a bipolar action (in the case of the circuit shown in FIG. 9), resonant waveforms are shaped at the nodes V1 and V2. Moreover, interference between the resonant waveforms at the nodes V1 and V2 introduces a state expressed as: V1−V2>Vbi.

Hence, it is assumed that a condition of Vds>Vbi is satisfied, allowing a bipolar action to occur.

On the contrary, as shown in FIG. 3B, when a measure is taken against a bipolar action (in the case of the circuit shown in FIG. 1), resonant waveforms are not shaped at all at the node V1 or the node V2. Hence, it is assumed that no bipolar action occurs in this case.

Next, the following description will describe, with reference to FIGS. 4 through 7, example arrangement and operation of a charge pump circuit, to which the present invention is applicable.

FIG. 4 is a circuit diagram showing a 3-stage charge pump circuit in accordance with one embodiment of the present invention. Four charge transfer MOS transistors M1–M4 are connected in series. M1 and M2 in the first stage are of the N-channel type, and M3 and M4 in the second stage are of the P-channel type. In each of M1–M4, the drain is connected to the body so that they have the same potential, thereby making the gate-body voltage Vgb equal to the gate-drain voltage Vgd. Also, a power voltage Vdd is supplied to the drain of M1 as an input voltage Vin. Further, a step-up voltage Vout is outputted from the drain of M4 and is supplied to a current load LOAD.

C1, C2, and C3 represent external coupling capacitors having their one ends respectively connected to connection points (pumping nodes V1, V2, and V3) of the charge transfer MOS transistors M1–M4. A clock pulse CLK and an anti-phase clock pulse CLKB are alternately applied to the other ends of the coupling capacitors C1–C3. The clock pulse CLK is supplied from a clock driver CD1' arranged in the manner shown in FIG. 1. Also, the clock pulse CLKB is supplied from a clock driver CD2 of the same arrangement. The parasitic inductances LS1 and LS2 and the parasitic capacitances Cs are omitted in the drawing for ease of explanation.

Outputs from inverse level shift circuits S1 and S2 are supplied to the gates of the charge transfer MOS transistors M1 and M2, respectively. Also, outputs from non-inverse level shift circuits S3 and S4 are supplied to the gates of the charge transfer MOS transistors M3 and M4, respectively.

Figure 5A:
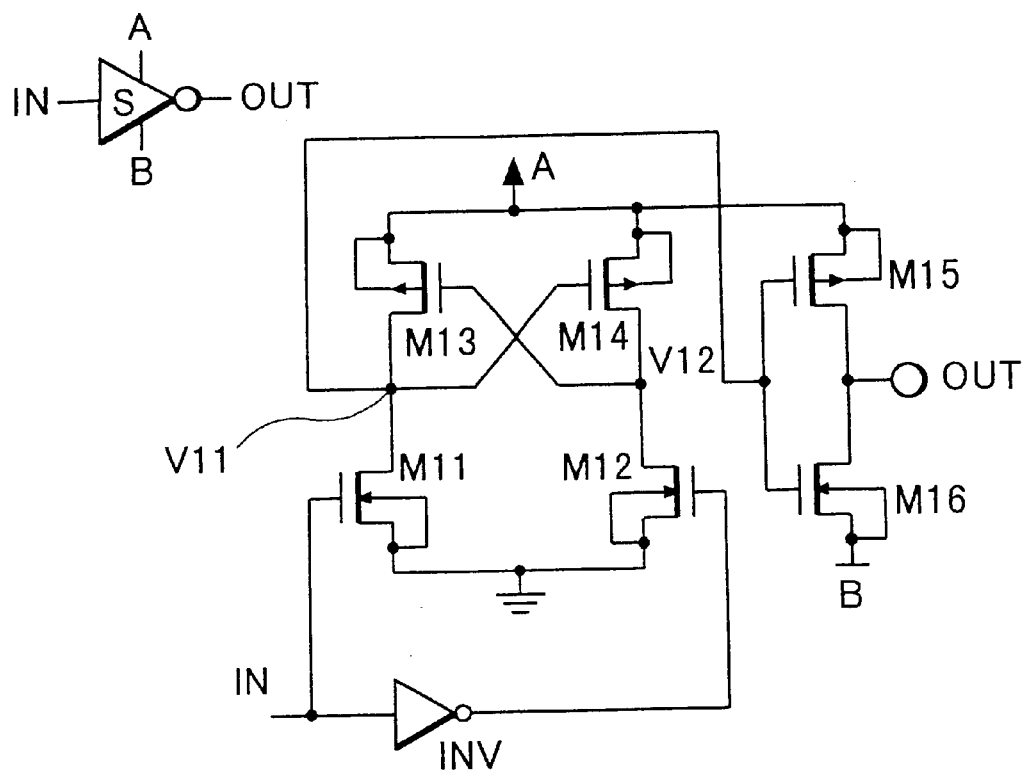
FIGS. 5A and 5B are views explaining an inverse level shift circuit.
Figure 5B:
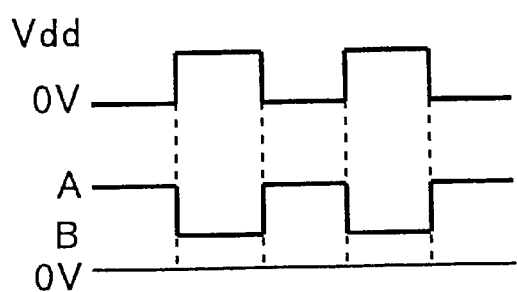

FIGS. 5A and 5B are views respectively showing a circuit arrangement and operation waveforms of the inverse level shift circuits S1 and S2. As shown in FIG. 5A, each inverse level shift circuit includes an input inverter INV, differential input MOS transistors M11 andM12, and cross-connected MOS transistors M13 and M14. In addition to the foregoing components, the level shift circuit includes MOS transistors M15 and M16 that together form an output inverter. A voltage V11 is applied to the gates of the MOS transistors M15 and M16, and a potential A is applied to the source of the MOS transistor M15 while a potential B is applied to the source of the MOS transistor M16. Here, the potential A>potential B. Also, M1 and M12 are of the N-channel type and M13–M16 are of the P-channel type.

FIG. 5B shows operation waveforms of the level shift circuit. The level shift circuit is characterized in that it alternately outputs the potential A and the intermediate potential B (A>B>0 V). Using these circuits makes it possible to maintain the gate-source voltage in each of the charge transfer MOS transistors M1 and M2 at a constant voltage (2 Vdd) when M1 and M2 are ON, which will be discussed below.

Figure 6A:
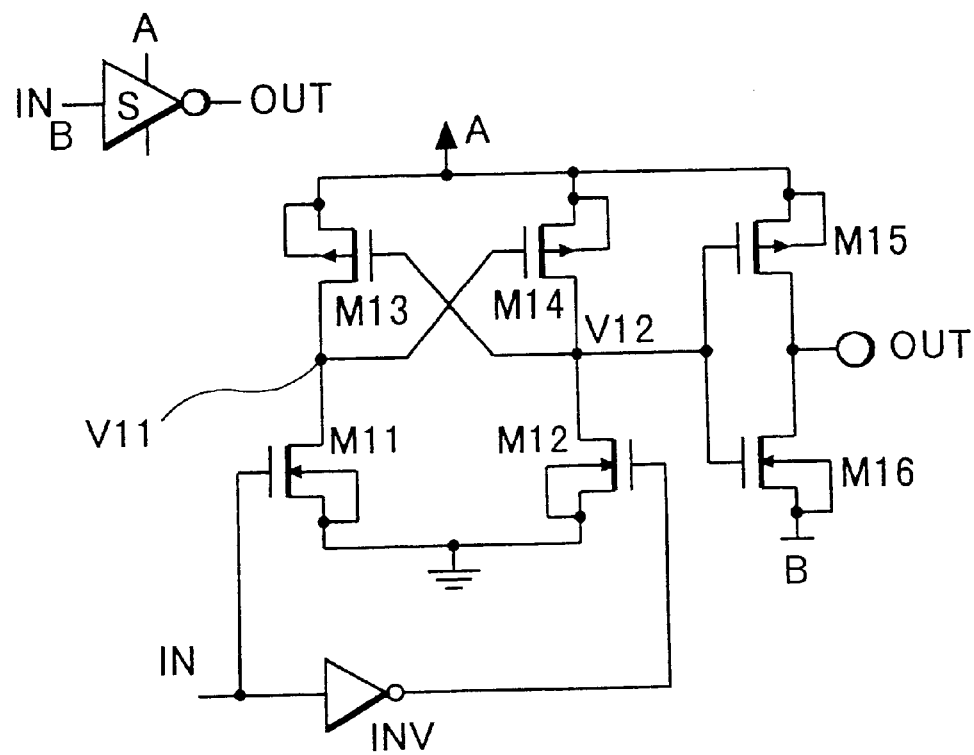
FIGS. 6A and 6B are views explaining a non-inverse level shift circuit.
Figure 6B:
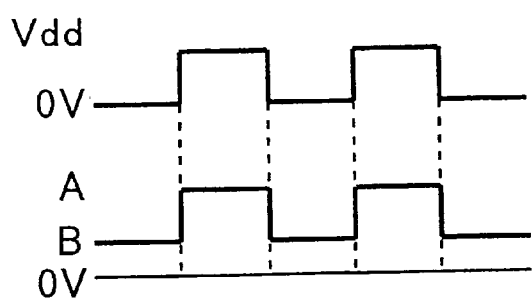

FIGS. 6A and 6B are views respectively showing a circuit arrangement and operation waveforms of the non-inverse level shift circuits S3 and S4. As shown in FIG. 6A, different from the inverse level shift circuits S1 and S2, a voltage V12 in anti-phase with respect to the voltage V11 are applied to the gates of the MOS transistors M15 and M16.

Hence, as the operation waveforms of FIG. 6B indicate, the non-inverse level shift circuits S3 and S4 perform a non-inverse level shift operation in response to the input voltage IN. Using these level shift circuit makes it possible to maintain the gate-source voltage in each of the charge transfer MOS transistors M3 and M4 at a constant voltage (2 Vdd) when M3 and M4 are ON, which will be discussed below.

Figure 7:
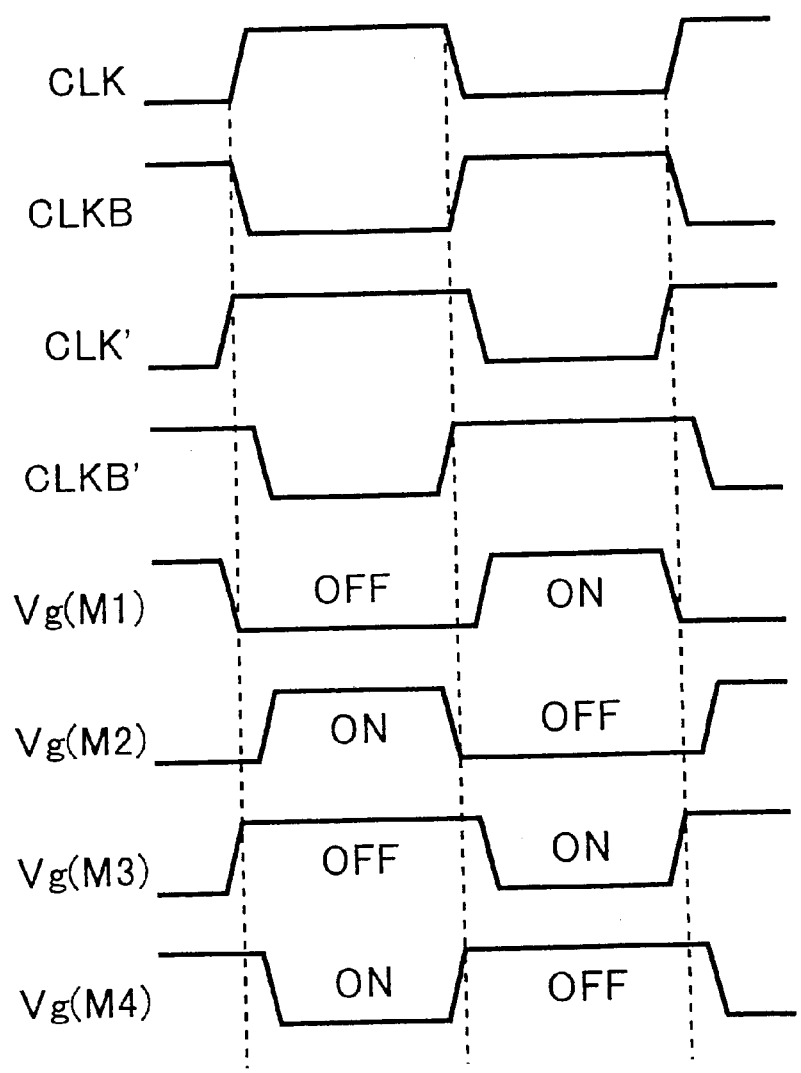
FIG. 7 is a timing chart explaining an operation of the charge pump circuit in accordance with another embodiment of the present invention.

The connection relation of the inverse level shift circuits S1 and S2 and the non-inverse level shift circuits S3 and S4 with respect to the charge pump circuit shown in FIG. 4 is as follows. That is, the clock pulse CLK' is inputted into the inverse level shift circuit S1 and the clock pulse CLKB' is inputted into the inverse level shift circuit S2. The clock pulses CLK' and CLKB' are generated from their respective originals, the clock pulses CLK and CLKB. However, in order to prevent a countercurrent from flowing into the charge transfer MOS transistors M1–M4, a longer LOW period is set in the clock pulses CLK' and CLKB'. In other words, it is arranged in such a manner that the charge transfer MOS transistors M1–M4 are switched OFF completely first, and thence a voltage at each pumping node is raised by a change in the clock pulses CLK and CLKB. FIG. 7 shows a phase relation among these clock pulses.

Also, as shown in FIG. 4, a step-up voltage V2 at the pumping node in the succeeding stage is fed back to the high potential side of the inverse level shift circuit S1 as the power source (potential A). Likewise, a step-up voltage V3 at the pumping node in the succeeding stage is fed back to the high potential side of the inverse level shift circuit S2 as the power source (potential A). Also, Vdd and Vl, which are the voltages at their respective stages, are respectively applied to the low potential sides of the inverse level shift circuits S1 and S2 as the power source (potential B).

On the other hand, a voltage V1 at the pumping node in the preceding stage is used as the power source (potential B) at the low potential side of the non-inverse level shift circuit S3. Likewise, the voltage V2 at the pumping node in the preceding stage is used as the power source (potential B) at the low potential side of the non-inverse level shift circuit S4. Also, V3 and Vout, which are the voltages at their respective stages, are respectively applied to the high potential sides of the inverse level shift circuits S3 and S4 as the power source (potential A).

According to the above arrangements, it is deduced that the gate-source voltage Vgs in each of the charge transfer transistors M1–M4 (when these transistors are ON) can be maintained at 2Vdd as discussed below. Firstly, a relation expressed by the following equations is established.

$Vgs(M1)=V2(\text{High})-Vdd$ $Vgs(M2)=V3(\text{High})-V1(\text{High})$ $Vgs(M3)=V1(\text{Low})-V3(\text{Low})$ $Vgs(M4)=V2(\text{Low})-Vout$ Secondly, another relation expressed by the following equations is further established from the step-up operation of the charge pump in a normal state.

$V1(\text{High})=2Vdd, \ V1(\text{Low})=Vdd$ $V2(\text{High})=3Vdd, \ V2(\text{Low})=2Vdd$ $V3(\text{High})=4Vdd, \ V3(\text{Low})=3Vdd, \ Vout=4Vdd$ From these relational expressions, it is deduced that when all the charge transfer MOS transistor are ON, the absolute value of Vgs in each is equal to one identical value, 2 Vdd. Hence, the ON resistance in each of the charge transfer MOS transistors M1–M4 is reduced by the high Vgs, thereby making it possible to achieve a charge pump circuit with high efficiency and a large output current. In addition, because it is sufficient to design a gate oxide film thick enough to withstand 2 Vdd for all the charge transfer MOS transistors M1–M4, the ON resistance can be designed lower than in a case where Vgs in each charge transfer MOS transistor is unequal, thereby improving the job efficiency. FIG. 7 is a timing chart explaining an operation of the charge pump circuit. The charge transfer MOS transistors M1–M4 perform the step-up operation as they are repetitively switched ON and OFF alternately in response to the clock pulses, and as a consequence, approximately 4 Vdd can be obtained as the output voltage Vout.

The present invention relates to a charge pump circuit of the Dickson type, and is characterized by the clock drivers CD1 and CD2 for supplying the clock pulses to the coupling capacitors C1–C3. In other words, it is arranged in such a manner that the rising time and falling time of the clock pulses CLK and CLKB are extended to the extent that the outputs from the clock drivers CD1 and CD2 will not cause resonance.

Therefore, it should be appreciated that the present invention is not limited to the charge pump circuit in accordance with the above embodiment, and it can be also applied effectively to any charge pump circuit having charge transfer MOS transistors. The effect of the present invention is especially outstanding when the present invention is applied to a charge pump circuit having the charge transfer MOS transistors with the drain and the body in each being short-circuited because a bipolar action readily occurs in such a charge pump circuit.

According to the present invention, the rising time and falling time of the clock drivers for supplying step-up clock pulses to the coupling capacitors of the charge pump circuit are set longer than a time necessary for the resonant waveforms to be shaped. Accordingly, a resonance phenomenon caused by parasitic inductances and the like can be prevented. As a result, a bipolar action induced by the resonance phenomenon can be prevented in a reliable manner, and hence, the circuit efficiency $\phi$ can be enhanced.

Also, when the charge pump circuit is used as a power source circuit, in particular, a clock outputted from the clock driver changes gradually, which suppresses generation of noises. As a result, it is possible to prevent noises from being added to the circuits in the LS1 to which the power is supplied.

What is claimed is:

1. A charge pump circuit, comprising:

a plurality of charge transfer MOS transistors connected in series;

coupling capacitors having their one ends respectively connected to connection points of said charge transfer MOS transistors; and clock drivers for alternately supplying clock pulses in anti-phase to the other ends of said coupling capacitors, where in a predetermined voltage being applied to the charge transfer MOS transistor in a first stage, so that a step-up voltage is outputted from the charge transfer MOS transistor in a latter stage, and a rising time and a falling time of the clock pulses outputted from said clock drivers are set longer than a time necessary for resonance of outputs from said clock drivers to occur.

2. The charge pump circuit according to claim 1, wherein the rising time and the falling time of the clock pulses outputted from said clock drivers are longer than a resonant period of the outputs from said clock drivers.

3. The charge pump circuit according to claim 1, wherein each of said clock drivers includes:

first and second invertors into which an identical clock signal is inputted;

a first output transistor, driven by an output from said first inverter, for outputting a high level; and a second output transistor, driven by an output from said second inverter, for outputting a low level, said first and second invertors respectively driving said first and second output transistors in a high output resistance state.

4. The charge pump circuit according to claim 3, wherein said first inverter includes a first P-channel type MOS transistor and a first N-channel type MOS transistor;

said second inverter includes a second P-channel type MOS transistor and a second N-channel type MOS transistor; and said first N-channel type MOS transistor is designed in a size to become a high ON resistance state.

5. The charge pump circuit according to claim 3 or 4, wherein said first inverter includes a first P-channel type MOS transistor and a first N-channel type MOS transistor;

said second inverter includes a second P-channel type MOS transistor and a second N-channel type MOS transistor; and said second P-channel type MOS transistor is designed in a size to become a high ON resistance state.

6. The charge pump circuit according to claim 1, wherein each of said clock drivers includes:

first and second invertors into which an identical clock signal is inputted;

a first output transistor for outputting a high level in response to an output from said first inverter; and a second output transistor for outputting a low level in response to an output from said second inverter, said first output transistor and said second output transistors being connected to each other, so that a connection thereof form an output terminal of the clock driver, and wherein outputs from said first and second inverters are controlled in such a manner that, when said first output transistor outputs the high level, said second output transistor is switched OFF, and when said second output transistor outputs the low level, said first output transistor is switched OFF, whereby a lead-through current is prevented from flowing through said first and second output transistors.

7. The charge pump circuit according to any of claims 1, 2, 3 and 6, wherein a drain and a body are short-circuited in each of said charge transfer MOS transistors.

8. The charge pump circuit according to claim 7, wherein the drain and the body in each of said charge transfer MOS transistors are connected to each other through a wire.

* * * * *